United States Patent
Park et al.

(10) Patent No.: US 8,849,298 B2
(45) Date of Patent: Sep. 30, 2014

(54) TRANSMIT POWER SETTING METHOD AND MOBILE TELECOMMUNICATION SYSTEM USING THE SAME

(75) Inventors: Byoung Seong Park, Incheon (KR); Jung Seung Lee, Uiwang-si (KR)

(73) Assignee: LG-Ericsson Co., Ltd., Seoul (KR)

( * ) Notice: Subject to any disclaimer, the term of this patent is extended or adjusted under 35 U.S.C. 154(b) by 175 days.

(21) Appl. No.: 13/352,551

(22) Filed: Jan. 18, 2012

(65) Prior Publication Data

US 2013/0183985 A1    Jul. 18, 2013

(51) Int. Cl.
H04W 36/08    (2009.01)
H04W 52/24    (2009.01)

(52) U.S. Cl.
USPC .................. 455/452.2; 455/444; 455/522

(58) Field of Classification Search
CPC .. H04W 36/30; H04W 52/241; H04W 52/244
USPC ........... 455/452.2, 444, 522, 69, 114.2, 127.2
See application file for complete search history.

(56) References Cited

U.S. PATENT DOCUMENTS

| | | | |
|---|---|---|---|
| 6,337,989 B1 * | 1/2002 | Agin | 455/522 |
| 6,526,261 B1 * | 2/2003 | Takeuchi et al. | 455/69 |
| 2002/0058482 A1 * | 5/2002 | Agin et al. | 455/69 |
| 2002/0160799 A1 * | 10/2002 | Kanemoto et al. | 455/522 |
| 2007/0173280 A1 * | 7/2007 | Nakayauchi et al. | 455/522 |
| 2007/0197251 A1 * | 8/2007 | Das et al. | 455/522 |
| 2010/0130133 A1 * | 5/2010 | Lou et al. | 455/63.1 |
| 2011/0002284 A1 * | 1/2011 | Talwar et al. | 370/329 |
| 2011/0059691 A1 * | 3/2011 | Hegge | 455/11.1 |
| 2011/0149769 A1 * | 6/2011 | Nagaraja | 370/252 |
| 2012/0178493 A1 * | 7/2012 | Marquez | 455/522 |

FOREIGN PATENT DOCUMENTS

KR   10-2008-0054148    6/2008

* cited by examiner

*Primary Examiner* — Qun Shen
(74) *Attorney, Agent, or Firm* — Ked & Associates, LLP

(57) ABSTRACT

A method for setting transmit power of a small base station by using a signal to interference and noise ratio (SINR) received by the small base station while the small base station is providing service and a mobile telecommunication system using the same. In one embodiment, a mobile telecommunication system includes a network base station configured to variably set a transmit power so that a signal to interference and noise ratio received from a user equipment may fall between an upper limit and a lower limit of a predetermined target signal to interference and noise ratio.

6 Claims, 4 Drawing Sheets

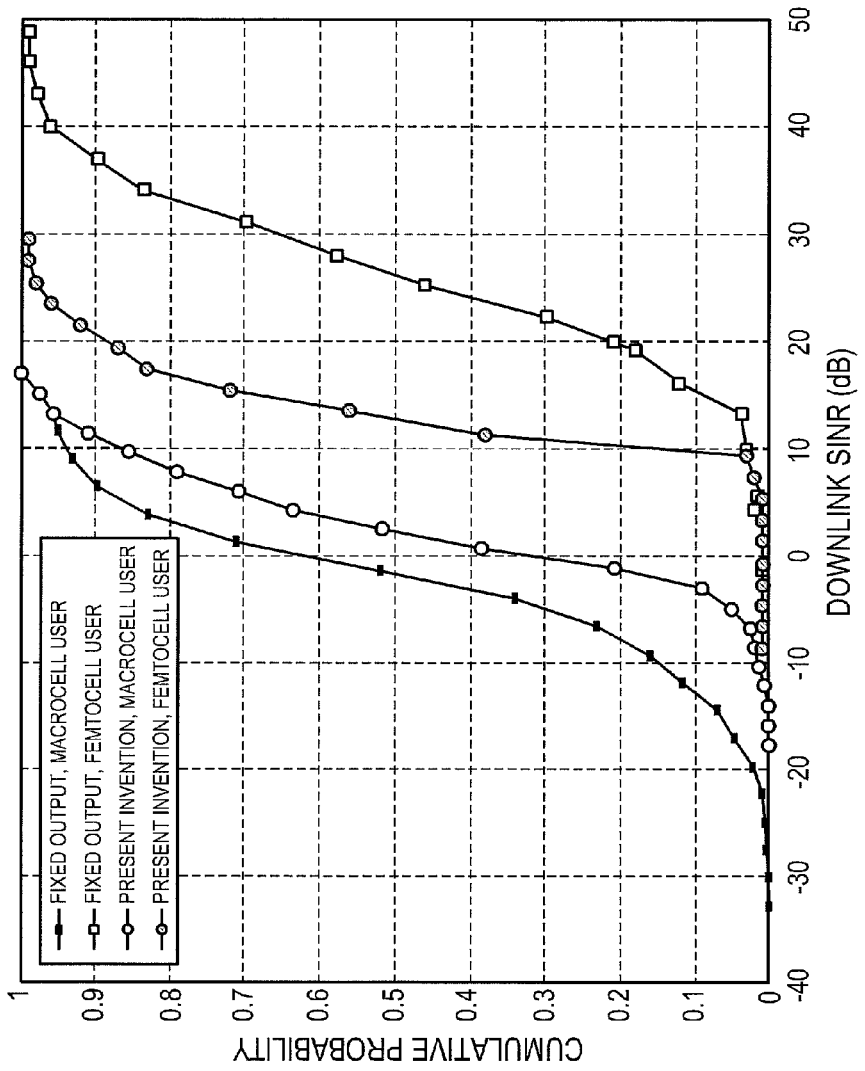

TRANSMIT POWER SETTING METHOD AND MOBILE TELECOMMUNICATION SYSTEM USING THE SAME

TECHNICAL FIELD

The present invention generally relates to a mobile telecommunication system and a transmit power setting method, and more particularly to a method for setting a transmit power of a small base station by using a signal to interference and noise ratio (SINR) received by the small base station while the small base station is providing service.

BACKGROUND

Recently, wireless data services through code division multiple access (CDMA) 2000, evolution data only (EV-DO), wideband CDMA (WCDMA) and wireless local area networks (WLANs) have been commercialized. Thus, the residential use of mobile phones and the demand for mobile data at home have increased steadily. If technologies such as long term evolution (LTE) and worldwide interoperability for microwave access (WiMAX) are commercialized in the future, there will be a sharp rise in such demand. To keep up with such trend, a method for providing mobile telecommunication services by installing a small base station indoors has been proposed so as to access a core network of the mobile telecommunication system through an indoor broadband network. The small base station may include a femto base station, a pico base station, a micro base station, an indoor base station and a relay for use in cell expansion.

A network base station constituting a mobile telecommunication network may include an outdoor base station and a small base station. Transmit output of the small base station may have a value determined when the system is initially installed or a value determined by a self-configuration function of the small base station. While the small base station is providing service for a user, the transmit output of the small base station cannot be adjusted automatically according to changes in interference environments created by the outdoor base stations and other small base stations, which are located adjacent to the small base station. In other words, the small base station has a fixed output high enough to secure a service area for a user equipment of the small base station. The transmit output of the small base station can be adjusted manually or through a management server depending on the link performance.

In such a small base station, the transmit output cannot reflect the actual link performance of the user of the small base station, thus resulting in degradation of the link performance of the user of the small base station. Performance degradation of the neighboring base stations may also be caused due to excessively high transmit output of the small base station. However, the small base station fails to handle such performance degradation problems while providing service for the user.

SUMMARY

The present disclosure provides some embodiments of a method for setting transmit power of a small base station by using a signal to interference and noise ratio (SINR) received by the small base station while the small base station is providing service and a mobile telecommunication system using the same.

According to one embodiment, a mobile telecommunication system includes: a network base station configured to variably set transmit power by using a relationship between a signal to interference and noise ratio received from an user equipment and upper and lower limits of a predetermined reference signal to interference and noise ratio.

According to one embodiment, a transmit power setting method includes: receiving, at a network base station, a signal to interference and noise ratio from a user equipment; and variably setting transmit power at the network base station by using the signal to interference and noise ratio and upper and lower limits of a predetermined reference signal to interference and noise ratio.

BRIEF DESCRIPTION OF THE DRAWINGS

FIG. 4 is a graph showing a performance difference according to a transmit power setting method in accordance with one embodiment.

DETAILED DESCRIPTION

Figure 1:
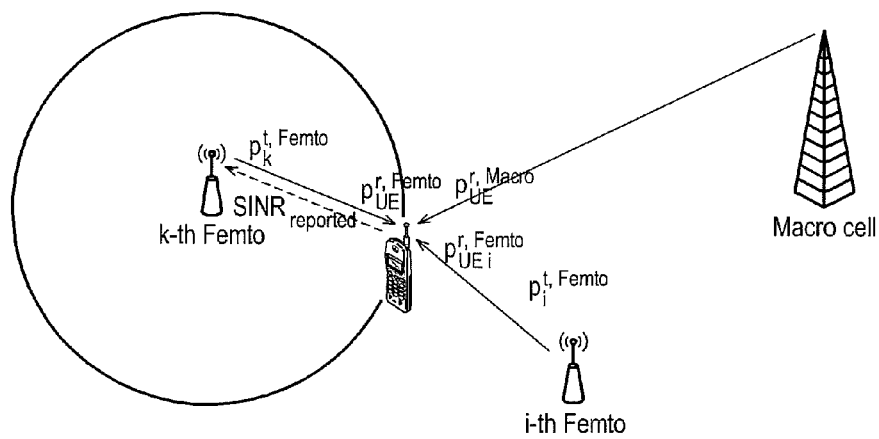
FIG. 1 is a diagram showing a mobile telecommunication system in accordance with one embodiment.

Embodiments of the present disclosure will now be described in detail with reference to the drawings. In the following, detailed descriptions of well-known functions and constructions will be omitted to avoid obscuring the essence of the present disclosure.

In a mobile telecommunication system, a number of subscriber equipment and a number of base stations (small base stations and outdoor base stations) use the same frequency channel at the same time. The use of the same frequency channel causes interferences among the simultaneous callers and the base stations. Thus, each base station is required to properly control its transmit power in order to improve system efficiency and call quality. In one embodiment, the small base station may include a femto base station, a pico base station, a micro base station, an indoor base station, a relay for use in cell expansion and the like. Further, in one embodiment, a network base station may include an outdoor base station and a small base station. In the drawings, a cell of the outdoor base station is a macrocell and a cell of the small base station is a femtocell by way of example.

Figure 2:
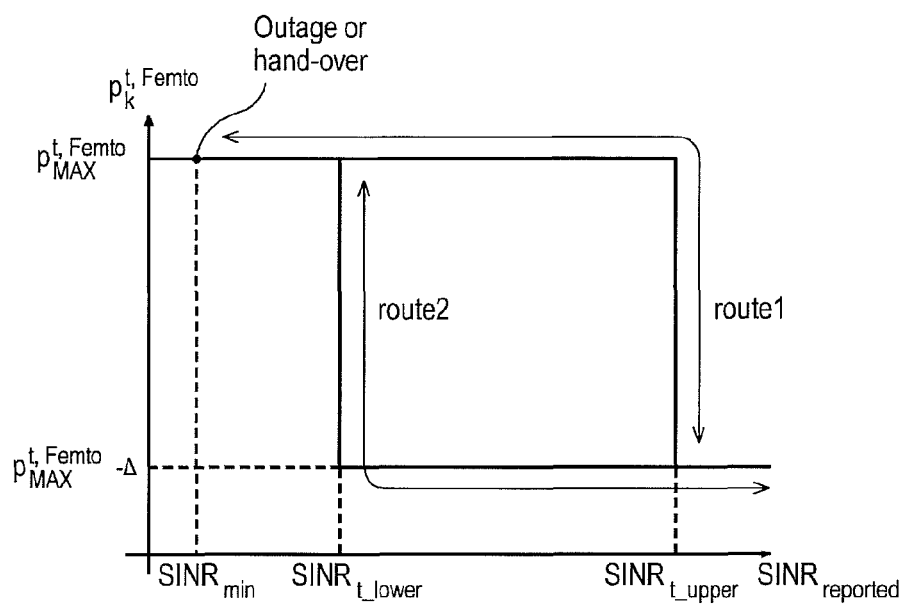
FIG. 2 is a graph for determining transmit power of a small base station in accordance with one embodiment.

FIG. 1 is a diagram showing a mobile telecommunication system in accordance with one embodiment and FIG. 2 is a graph for determining transmit power of the small base station in accordance with one embodiment. A signal to interference and noise ratio $SINR_{reported}$, which is periodically transmitted to the small base station by a user equipment UE included in the service area of the small base station, can be expressed as follows.

$$SINR_{reported} = \frac{P_{UE,k}^{r,Femto}}{\sum_{\substack{i=1 \\ i \neq k}}^{N} P_{UE,i}^{r,Femto} + P_{UE}^{r,Macro} + P_{UE}^{r,Thermal}} \quad (1)$$

wherein $P_{UE,i}^{r,Femto}$ represents interference caused by the small base station adjacent to the user equipment UE, $P_{UE}^{r,Macro}$ represents interference caused by the outdoor base station adjacent to the user equipment UE, $P_{UE}^{r,Thermal}$ represents noise component of the user equipment UE of the small base station and $P_{UE,k}^{r,Femto}$ represents a signal component of the user equipment UE of the small base station. A maximum output of the small base station is represented as $P_{MAX}^{t,Femto}$ and a dynamic range of the transmit power of the small base station is represented as $\Delta$. $\Delta$ is a value fixed according to the characteristics of a power amplifier. Two values $SINR_{t-lower}$ (lower limit) and $SINR_{t-upper}$ (upper limit) in the range of a reference signal to interference and noise ratio are compared with the signal to interference and noise ratio $SINR_{reported}$ which is reported by the user equipment UE included in the service area of the small base station to thereby determine the transmit power of the small base station. A minimum required reference signal to interference and noise ratio for allowing the small base station to provide service is represented as $SINR_{min}$.

A change in the transmit power of the small base station may cause mutual interferences with the neighboring small base stations. Thus, sections where the transmit power of the small base station is not changed, such as routes 1 and 2 in FIG. 2, may be set to prevent radiation of the transmit powers of the neighboring small base stations at $P_{MAX}^{t,Femto}$ or $P_{MAX}^{t,Femto}-\Delta$ due to the mutual interferences between the small base stations and to suppress frequent changes in the transmit power of the small base station. The transmit power of the small base station may be varied within the range from $P_{MAX}^{t,Femto}-\Delta$ to $P_{MAX}^{t,Femto}$ due to the dynamic range $\Delta$. Route 1 is a section where $SINR_{min} < SINR_{reported} < SINR_{t-upper}$ and route 2 is a section where $SINR_{t-lower} < SINR_{reported}$. For example, if a user of the small base station is in the periphery of the coverage area of the small base station, where the channel state is not favorable and $SINR_{reported} = SINR_{min}$ and $P_k^{t,Femto} = P_{MAX}^{t,Femto}$, the user of the small base station moves closer to the small base station so that the channel state becomes favorable, at which time the transmit power of the small base station may be set to be $P_k^{t,Femto} = P_{MAX}^{t,Femto}$ until $SINR_{reported}$ reaches $SINR_{t-upper}$ (i.e., $SINR_{reported} = SINR_{t-upper}$) according to route 1. In other words, the transmit power of the small base station may be maintained at a maximum level. In the state where $SINR_{reported} = SINR_{t-upper}$, if the channel state becomes more favorable so that $SINR_{reported}$ exceeds $SINR_{t-upper}$, the transmit power of the small base station may be decreased to be $P_k^{t,Femto} = P_{MAX}^{t,Femto}-\Delta$. In other words, the transmit power of the small base station may be decreased to a minimum level. Thereafter, in a still more favorable channel state, $SINR_{reported}$ higher than $SINR_{t-upper}$ can be obtained with the minimum output, that is, $P_k^{t,Femto} = P_{MAX}^{t,Femto}-\Delta$, according to route 2. On the other hand, in the state where $P_k^{t,Femto} = P_{MAX}^{t,Femto}-\Delta$, if the channel state deteriorates, the transmit power may be maintained to be $P_k^{t,Femto} = P_{MAX}^{t,Femto}-\Delta$ in the section where $SINR_{reported} > SINR_{t-lower}$ according to route 2. Further in the state where $P_k^{t,Femto} = P_{MAX}^{t,Femto}-\Delta$, if the channel status becomes worse at the section where $SINR_{reported} = SINR_{t-lower}$ and, thus, $SINR_{reported}$ has a value less than $SINR_{t-lower}$, the transmit power may be raised until $P_k^{t,Femto}$ reaches $P_{MAX}^{t,Femto}$ (i.e., $P_k^{t,Femto} = P_{MAX}^{t,Femto}$). The transmit power of the small base station cannot be raised over $P_{MAX}^{t,Femto}$. Thus, in the case that the channel state becomes even worse so that $SINR_{reported} = SINR_{min}$, it is determined that the service from the small base station cannot be maintained any more and a handover to the neighboring base station may be performed. At this time, if the handover fails to operate, a call drop may occur. If a plurality of small base stations are present, which may mutually interfere with one another, $SINR_{t-lower}$ and $SINR_{t-upper}$ serve to keep a certain small base station from radiating its transmit power under the influence of other small base stations. For example, if the transmit power of a certain small base station is raised, interference components affecting other small base stations increase and, therefore, the transmit powers of the neighboring small base stations are also raised. In return, interference components affecting the certain small base station increase and then the transmit power of the certain small base station is raised accordingly. In this case, $SINR_{t-lower}$ and $SINR_{t-upper}$ may be set in the section where the transmit power of the small base station varies to thereby fix the transmit power therebetween. The transmit power of the small base station may be fixed temporarily at the lower limit and the upper limit in the power increasing section and the power decreasing section, respectively, so that the transmit power of the small base station converges. A convergence degree of the transmit power of the small base station is expected to vary depending on the values of the lower and upper limits, which are set to proper values according to the channel state surrounding the small base station.

Figure 3:
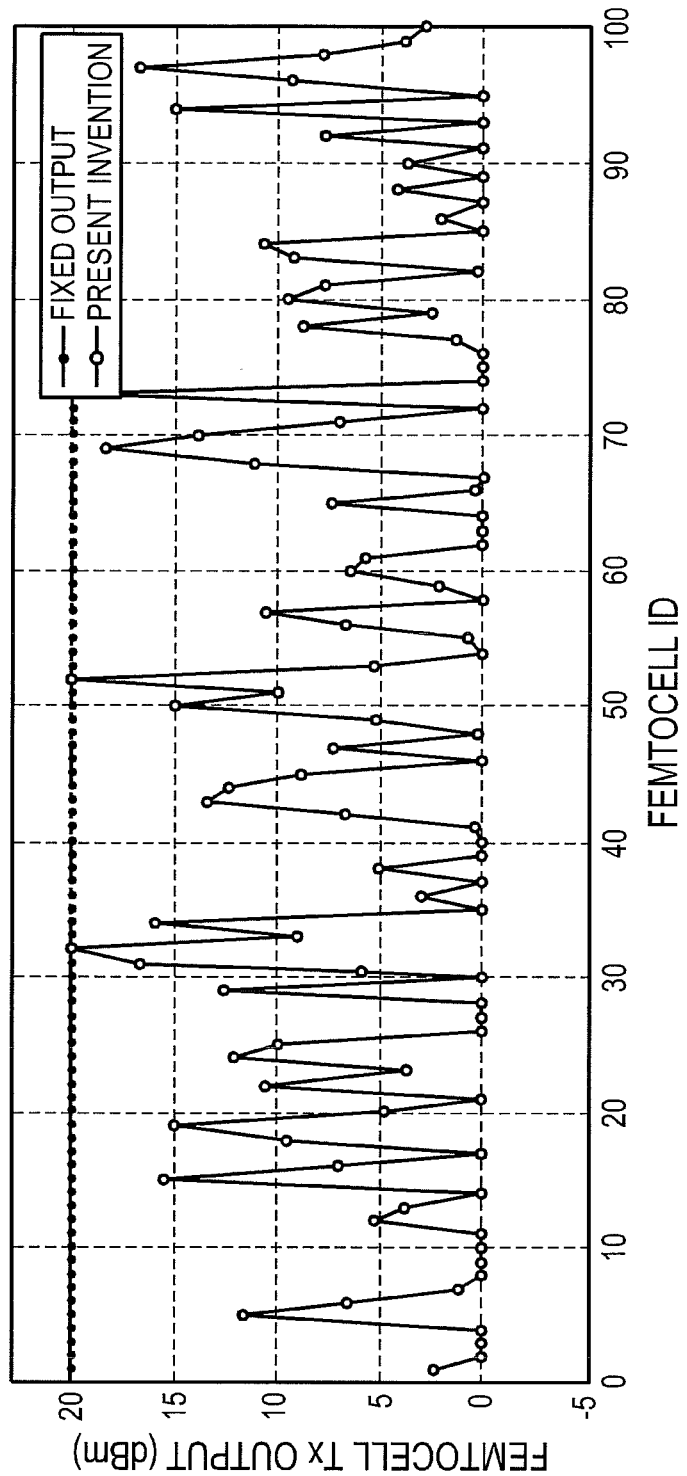
FIG. 3 is a graph showing changes in transmit power of the small base station in accordance with one embodiment.

In one embodiment, when one hundred small base stations with a size of 10 m×10 m are randomly arranged within a service area of the outdoor base station with a coverage of 1 km and $P_{MAX}^{t,Femto}$, $\Delta$, $SINR_{t-upper}$ and $SINR_{t-lower}$ are set to be $P_{MAX}^{t,Femto} = 20$ dBm, $\Delta = 20$ dB, $SINR_{t-upper} = 10$ dB and $SINR_{t-lower} = 0$ dB, the transmit power levels of the one hundred small base stations in accordance with the present embodiment are as shown in FIG. 3. At this time, the transmit powers of the one hundred small base stations may be determined according to the surrounding interference environments which may vary depending upon the locations of the small base stations.

In the above embodiment, a method for controlling the transmit power by using the SINR transmitted to the small base station by the user equipment UE is explained by way of example. However, modulation and coding set (MCS), channel quality indicator (CQI), acknowledgment/negative acknowledgement (Ack/Nack) information and the like may also be used to control the transmit power, through which the states of the channel and/or link performance of the user equipment can be predicted.

While the above-described methods are explained with reference to certain exemplary embodiments, the methods can also be realized as a computer readable code in a computer readable recording medium. The computer readable recording medium may include any form of recording apparatus as long as the recording apparatus can store data readable by a computer system. By way of example, the computer readable recording medium may be a ROM, a RAM, a CD-ROM, a magnetic tape, a floppy disk, an optical data storage unit or the like. The computer readable recording medium may also be realized in the form of a carrier wave (e.g., transmission via internet). The computer readable recording medium may be distributed in the computer system connected by a network, where the computer readable code can be stored and executed in a distribution manner. A functional program and, a code and its segments for realizing the above-described embodiments can be easily implemented by programmers skilled in the art.

As used in this application, entities for executing the actions can refer to a computer-related entity, either hardware, a combination of hardware and software, software, or software in execution. For example, an entity for executing an action can be, but is not limited to being, a process running on a processor, a processor, an object, an executable, a thread of execution, a program, and a computer. By way of illustration, both an application running on an apparatus and the apparatus can be an entity. One or more entities can reside within a process and/or thread of execution and an entity can be localized on one apparatus and/or distributed between two or more apparatuses.

The program for realizing the functions can be recorded in the apparatus, can be downloaded through a network to the apparatus and can be installed in the apparatus from a computer readable storage medium storing the program therein. A form of the computer readable storage medium can be any form as long as the computer readable storage medium can store programs and is readable by an apparatus such as a disk type ROM and a solid-state computer storage media. The functions obtained by installation or download in advance in this way can be realized in cooperation with an OS (Operating System) in the apparatus.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A mobile telecommunication system, comprising a network base station configured to variably set a transmit power by using a relationship between a signal to interference and noise ratio received from a user equipment and upper and lower limits of a predetermined reference signal to interference and noise ratio,
wherein, when the signal to interference and noise ratio is equal to or lower than the lower limit of the reference signal to interference and noise ratio, the transmit power is set to a maximum level and, when the signal to interference and noise ratio is equal to or higher than the upper limit of the reference signal to interference and noise ratio, the transmit power is set to a minimum level,
wherein the network base station is a small base station, the small base station including at least one of a femto base station, a pico base station, a micro base station, an indoor base station, or a relay for use in cell expansion, and
wherein the signal to interference and noise ratio includes information on interference caused by at least one of a neighboring small base station, interference caused by a neighboring outdoor base station, noise component of the user equipment or signal component of the user equipment.

2. The mobile telecommunication system of claim 1, wherein, in the state that the transmit power is set to the maximum level, if the signal to interference and noise ratio is equal to or lower than a minimum required reference signal to interference and noise ratio, a handover of the user equipment to a neighboring base station is performed.

3. The mobile telecommunication system of claim 2, wherein the minimum required reference signal to interference and noise ratio has a value lower than the lower limit of the reference signal to interference and noise ratio.

4. A transmit power setting method, comprising:
receiving, at a network base station, a signal to interference and noise ratio from a user equipment, and
variably setting transmit power at the network base station by using the signal to interference and noise ratio and upper and lower limits of a predetermined reference signal to interference and noise ratio,
wherein the setting of the transmit power includes setting the transmit power to a maximum level when the signal to interference and noise ratio is equal to or lower than the lower limit of the reference signal to interference and noise ratio, and setting the transmit power to a minimum level when the signal to interference and noise ratio is equal to or higher than the upper limit of the reference signal to interference and noise ratio,
wherein the network base station is a small base station, the small base station including at least one of a femto base station, a pico base station, a micro base station, an indoor base station, or a relay for use in cell expansion, and
wherein the signal to interference and noise ratio includes information on interference caused by at least one of a neighboring small base station, interference caused by a neighboring outdoor base station, noise component of the user equipment or signal component of the user equipment.

5. The transmit power setting method of claim 4, wherein, in the state that the transmit power is set to the maximum level, the setting of the transmit power further includes setting a handover of the user equipment to a neighboring base station to be performed if the signal to interference and noise ratio is equal to or lower than a minimum required reference signal to interference and noise ratio.

6. The transmit power setting method of claim 5, wherein the minimum required reference signal to interference and noise ratio has a value lower than the lower limit of the reference signal to interference and noise ratio.

* * * * *